United States Patent
Nishi et al.

(10) Patent No.: US 9,954,454 B2
(45) Date of Patent: Apr. 24, 2018

(54) DC/DC CONVERTER AND ELECTRICAL STORAGE SYSTEM

(71) Applicant: TOYOTA JIDOSHA KABUSHIKI KAISHA, Toyota-shi, Aichi-ken (JP)

(72) Inventors: Yuji Nishi, Nagoya (JP); Hiromasa Tanaka, Okazaki (JP); Masanori Ishigaki, Nagakute (JP); Shuji Tomura, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 58 days.

(21) Appl. No.: 15/129,123

(22) PCT Filed: Mar. 13, 2015

(86) PCT No.: PCT/IB2015/000325
§ 371 (c)(1),
(2) Date: Sep. 26, 2016

(87) PCT Pub. No.: WO2015/145232
PCT Pub. Date: Oct. 1, 2015

(65) Prior Publication Data
US 2017/0110975 A1    Apr. 20, 2017

(30) Foreign Application Priority Data
Mar. 28, 2014 (JP) .................... 2014-067997

(51) Int. Cl.
*H02P 1/00* (2006.01)
*H02M 3/335* (2006.01)
(Continued)

(52) U.S. Cl.
CPC ........... *H02M 3/33584* (2013.01); *B60L 7/14* (2013.01); *B60L 11/1803* (2013.01);
(Continued)

(58) Field of Classification Search
USPC ................... 318/139, 769, 780, 813, 400.31
See application file for complete search history.

(56) References Cited

U.S. PATENT DOCUMENTS

| 2010/0078997 A1 | 4/2010 | Chen et al. |
| 2012/0223575 A1 | 9/2012 | Hachiya et al. |
| 2016/0303984 A1* | 10/2016 | Lee .................. H02M 1/15 |

FOREIGN PATENT DOCUMENTS

| EP | 1801960 A2 | 6/2007 |
| JP | 2012-182894 A | 9/2012 |

(Continued)

OTHER PUBLICATIONS

Muhammed Shamveel et al: "Isolated Bidirectional DC-DC Power Supply for Charging and Discharging Battery", Dec. 23, 2013, 6 pages total.

*Primary Examiner* — Bentsu Ro
*Assistant Examiner* — Iftekhar Mustafa
(74) *Attorney, Agent, or Firm* — Sughrue Mion, PLLC

(57) ABSTRACT

A DC/DC converter is able to step down a voltage value of a high-voltage battery, and is able to step up a voltage value of a low-voltage battery. The low-voltage battery is a battery that provides a lower voltage value than the high-voltage battery. The DC/DC converter includes a transformer, a third diode and a reactor. The transformer includes a first coil and a second coil. The first coil is connected to the low-voltage battery. The second coil is connected to the high-voltage battery. An anode of the third diode is connected to one end of the first coil. One end of the reactor is connected to a cathode of the third diode, and the other end of the reactor is connected to a positive electrode terminal of the low-voltage battery.

3 Claims, 3 Drawing Sheets

(51) Int. Cl.
*H02P 27/06* (2006.01)
*B60L 15/00* (2006.01)
*B60L 7/14* (2006.01)
*B60L 11/18* (2006.01)

(52) U.S. Cl.
CPC ....... *B60L 11/1861* (2013.01); *B60L 11/1868* (2013.01); *B60L 15/007* (2013.01); *H02P 27/06* (2013.01); *B60L 2210/12* (2013.01); *B60L 2210/14* (2013.01)

(56) References Cited

FOREIGN PATENT DOCUMENTS

JP  2014084185 A  *  5/2014
WO  9324987 A1  12/1993

* cited by examiner

DC/DC CONVERTER AND ELECTRICAL STORAGE SYSTEM

BACKGROUND OF THE INVENTION

1. Field of the Invention

The invention relates to a DC/DC converter that performs step-up operation and step-down operation, and an electrical storage system including the DC/DC converter.

2. Description of Related Art

A DC/DC converter described in Japanese Patent Application Publication No. 2012-182894 (JP 2012-182894 A) steps down an output voltage value of a high-voltage battery to a predetermined voltage value, and then charges a low-voltage battery with a stepped-down electric power. Here, in order to charge the low-voltage battery even when the voltage value of the high-voltage battery has decreased to a minimum voltage value as a result of a discharge of the high-voltage battery, the stepped-down voltage value should be higher than or equal to the voltage value of the low-voltage battery. In consideration of this point, the transformation ratio (the turns ratio of coils) of a transformer included in the DC/DC converter is set.

SUMMARY OF THE INVENTION

The DC/DC converter described in JP 2012-182894 A performs only step-down operation. However, by using the single transformer included in the DC/DC converter, it is possible to perform not only step-down operation but also step-up operation. In this case, because only the single transformer is used, a step-down transformation ratio is equal to a step-up transformation ratio. As described above, if the transformation ratio of the transformer is set in consideration of step-down operation, it is not possible to perform step-up operation at a transformation ratio larger than the set transformation ratio.

An aspect of the invention provides a DC/DC converter. The DC/DC converter is able to step down a voltage value of a high-voltage battery, and is able to step up a voltage value of a low-voltage battery. The low-voltage battery is a battery that provides a lower voltage value than the high-voltage battery. The DC/DC converter includes a transformer, a first switch element, a first diode, a first capacitor, a second switch element, a second diode, a second capacitor, a third diode, a reactor, a third switch element, a fourth diode, a fifth diode, a third capacitor, a fourth switch element and a sixth diode.

The transformer includes a first coil and a second coil. The first coil is connected to the low-voltage battery. The second coil is connected to the high-voltage battery. The first switch element is connected in series with the second coil. The first diode is connected in antiparallel with the first switch element. The first capacitor is connected in parallel with the first switch element. The second switch element is connected in parallel with the second coil. The second diode is connected in antiparallel with the second switch element. The second capacitor is connected in series with the second switch element.

An anode of the third diode is connected to one end of the first coil. One end of the reactor is connected to a cathode of the third diode. The other end of the reactor is connected to a positive electrode terminal of the low-voltage battery. One end of the third switch element is connected to a connection point between the first coil and the third diode. A cathode of the fourth diode is connected to the other end of the third switch element, and an anode of the fourth diode is connected to a connection point between the third diode and the reactor. The fifth diode is connected in antiparallel with the third switch element.

One end of the third capacitor is connected to a connection point between the third switch element and the fourth diode, and the third capacitor is connected in parallel with the first coil and the low-voltage battery. One end of the fourth switch element is connected to an anode of the fourth diode and a connection point between the third diode and the reactor, and the fourth switch element is connected in parallel with the first coil and the low-voltage battery. The sixth diode is connected in antiparallel with the fourth switch element.

In the DC/DC converter according to the invention, by using the single transformer, it is possible to step down the voltage value of the high-voltage battery or step up the voltage value of the low-voltage battery. At the time of step-down operation, it is possible to step down the voltage value of the high-voltage battery by using the transformation ratio (step-down ratio) of the transformer. On the other hand, at the time of step-up operation, it is possible to perform step-up operation with the use of the reactor and to perform step-up operation with the use of the transformer. By performing both step-up operations, it is possible to step up the voltage value of the low-voltage battery at a transformation ratio larger than the transformation ratio (step-up ratio) of the transformer.

The step-down operation of the DC/DC converter will be specifically described. By setting the first switch element to the on state, it is possible to pass exciting current from the high-voltage batter to the second coil, and it is possible to step down the voltage value of the high-voltage battery by using the transformation ratio (step-down ratio) of the transformer. The second switch element is used to reset magnetic energy stored in the transformer at the time of step-down operation. The third switch element is used to rectify current flowing through a low-voltage-side circuit.

An electric power that has undergone step-down operation is allowed to be supplied to the low-voltage battery or a load connected to the low-voltage battery. When the stepped-down electric power is supplied to the load, it is possible to operate the load. When the stepped-down electric power is supplied to the low-voltage battery, it is possible to charge the low-voltage battery. Even when the voltage value of the high-voltage battery decreases to a minimum voltage value, it is possible to set the transformation ratio of the transformer so that the low-voltage battery can be charged.

Next, the step-up operation of the DC/DC converter will be specifically described. Initially, in step-up operation with the use of the reactor, by setting the fourth switch element to an on state, current discharged from the low-voltage battery flows through the reactor, and magnetic energy is stored in the reactor. When the fourth switch element is set to an off state, magnetic energy stored in the reactor is released, and charge current flows to the third capacitor via the fourth diode. Thus, the voltage value of the third capacitor becomes higher than the voltage value of the low-voltage battery.

Subsequently, when the third switch element is set to an on state, an LC circuit is formed by the third capacitor and an inductance of the transformer, and it is possible to pass exciting current through the first coil. Thus, it is possible to increase the voltage value of the first coil and increase the voltage value of the second coil. Because of the transformation ratio (step-up ratio) of the transformer, the voltage value of the second coil becomes higher than the voltage value of the third capacitor.

A metal-oxide-semiconductor field-effect transistor (MOSFET) may be used as at least one of the first switch element, the second switch element, the third switch element and the fourth switch element. At this time, the diode connected in antiparallel with the switch element that is formed of the MOSFET is a parasitic diode included in the MOSFET.

In the above aspect, an electrical storage system may include the above-described DC/DC converter, a positive electrode line, a negative electrode line, a load, a pair of relays, a smoothing capacitor and a controller. The load is connected to the high-voltage battery via the positive electrode line and the negative electrode line. The pair of relays are respectively provided in the positive electrode line and the negative electrode line. The smoothing capacitor is connected to the positive electrode line and the negative electrode line. The controller may be configured to control the DC/DC converter and the pair of relays. The controller may be configured to step up a voltage value of the low-voltage battery with the use of the DC/DC converter before the pair of relays are switched from an off state to an on state. The controller may be configured to charge the smoothing capacitor with a stepped-up electric power.

It is possible to charge the smoothing capacitor with electric power that has been stepped up by the DC/DC converter. Specifically, before the pair of relays are switched from the off state to the on state, it is possible to charge the smoothing capacitor. Thus, before the pair of relays are set to the on state, it is possible to set the voltage value of the smoothing capacitor to the voltage value of the high-voltage battery or bring the voltage value of the smoothing capacitor close to the voltage value of the high-voltage battery. When the pair of relays are set to the on state after the smoothing capacitor is charged, it is possible to suppress flow of inrush current from the high-voltage battery to the smoothing capacitor.

With the DC/DC converter according to the invention, as described above, it is possible to perform step-up operation at a transformation ratio larger than the transformation ratio of the transformer. As described above, when the transformation ratio (step-down ratio) of the transformer is set in consideration of a minimum voltage value of the high-voltage battery, it is possible to perform step-up operation to the voltage value of the high-voltage battery even when the voltage value of the high-voltage battery becomes higher than the minimum voltage value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described.

Figure 1:
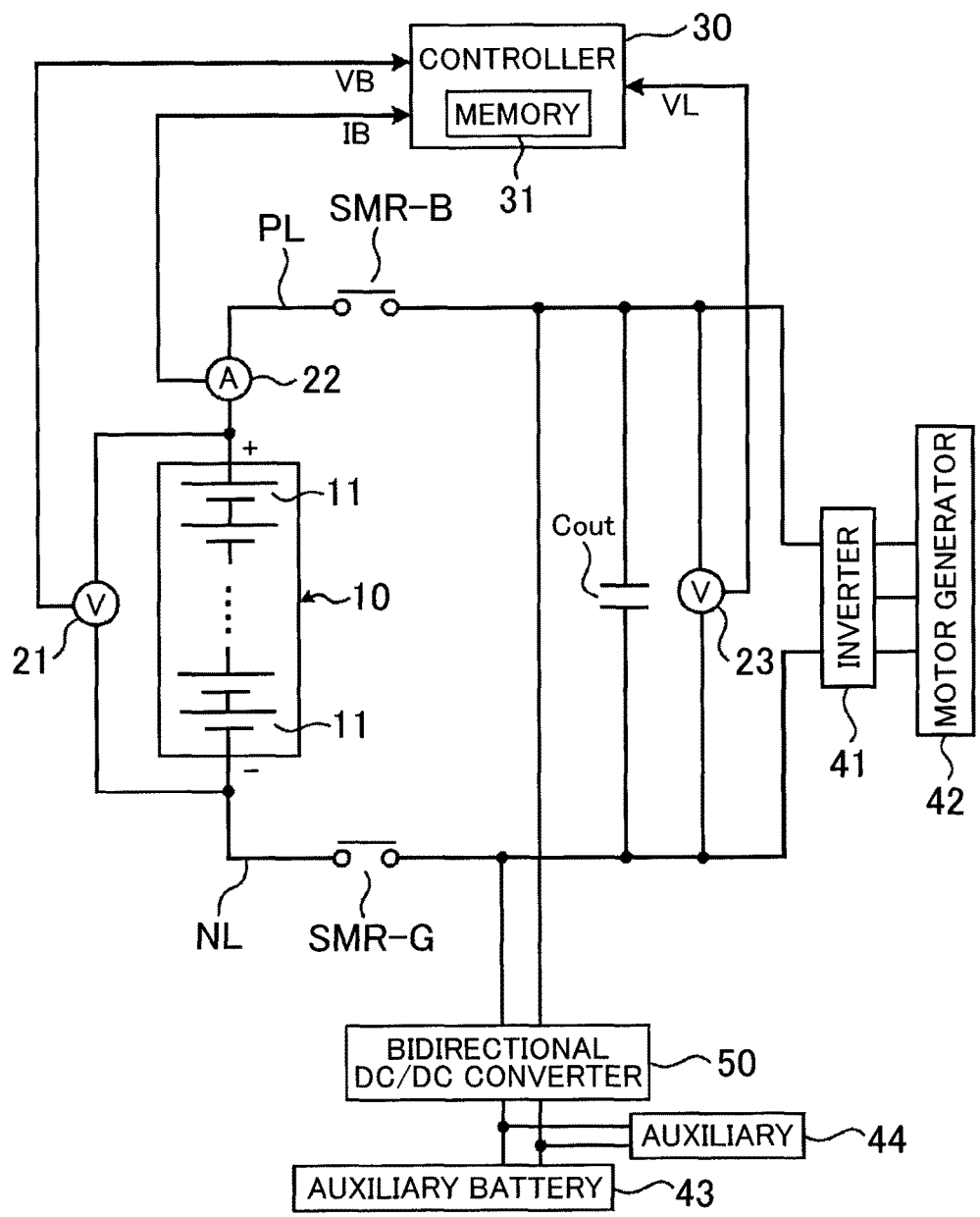
FIG. 1 is a view that shows the configuration of a battery system.

A battery system according to a first embodiment of the invention will be described. FIG. 1 is a view that shows the configuration of the battery system according to the present embodiment. The battery system according to the present embodiment is mounted on a vehicle. The vehicle is an electric vehicle or a hybrid vehicle. The electric vehicle includes only a main battery (described later) as a power source for propelling the vehicle. The hybrid vehicle includes an engine or a fuel cell in addition to the main battery (described later) as a power source for propelling the vehicle.

The main battery (which corresponds to a high-voltage battery according to the invention) 10 includes a plurality of single cells 11 connected in series with each other. A secondary battery, such as a nickel-metal hydride battery and a lithium ion battery, is used as each single cell 11. Instead of the secondary battery, an electric double layer capacitor may be used. A plurality of the single cells 11 connected in parallel with each other may be included in the main battery 10.

A voltage sensor 21 detects a voltage value VB of the main battery 10, and outputs the detected result (voltage value VB) to a controller 30. A current sensor 22 detects a current value IB of the main battery 10, and outputs the detected result (current value IB) to the controller 30. The controller 30 includes a memory 31. The memory 31 stores various pieces of information.

A positive electrode line PL is connected to the positive electrode terminal of the main battery 10. A negative electrode line NL is connected to the negative electrode terminal of the main battery 10. The main battery 10 is connected to an inverter 41 via the positive electrode line PL and the negative electrode line NL. A system main relay SMR-B is provided in the positive electrode line PL. A system main relay SMR-G is provided in the negative electrode line NL. Each of the system main relays SMR-B, SMR-G switches between an on state and an off state upon reception of a control signal from the controller 30.

A capacitor (smoothing capacitor) Cout is connected to the positive electrode line PL and the negative electrode line NL. Specifically, one end of the capacitor Cout is connected to the positive electrode line PL that connects the system main relay SMR-B to the inverter 41. The other end of the capacitor Cout is connected to the negative electrode line NL that connects the system main relay SMR-G to the inverter 41. A voltage sensor 23 detects a voltage value VL of the capacitor Cout, and outputs the detected result (voltage value VL) to the controller 30.

The inverter 41 converts direct-current power, output from the main battery 10, to alternating-current power, and outputs the alternating-current power to a motor generator (which corresponds to a load according to the invention) 42. The motor generator 42 generates kinetic energy upon reception of alternating-current power output from the inverter 41. The kinetic energy is used to propel the vehicle. The motor generator 42 is connected to wheels. The motor generator 42 is able to propel the vehicle by transmitting kinetic energy, generated by the motor generator 42, to the wheels.

The motor generator 42 converts kinetic energy, which is generated during braking of the vehicle, to electric energy (alternating-current power). The inverter 41 converts alternating-current power, generated by the motor generator 42, to direct-current power, and outputs the direct-current power to the main battery 10. Thus, it is possible to store regenerated electric power in the main battery 10.

A bidirectional DC/DC converter 50 is connected to the positive electrode line PL and the negative electrode line NL. Specifically, the DC/DC converter 50 is connected to the positive electrode line PL that connects the system main relay SMR-B to the inverter 41, and is connected to the negative electrode line NL that connects the system main relay SMR-G to the inverter 41.

When the system main relays SMR-B, SMR-G are in the on state, the DC/DC converter 50 steps down the voltage value VB of the main battery 10, and then outputs the stepped-down electric power to an auxiliary battery (which corresponds to a low-voltage battery according to the invention) 43 or an auxiliary 44. By supplying electric power from the main battery 10 to the auxiliary battery 43, it is possible to charge the auxiliary battery 43.

By supplying electric power from the main battery 10 to the auxiliary 44, it is possible to operate the auxiliary 44. It is also possible to supply the auxiliary 44 with electric power from the auxiliary battery 43. The auxiliary battery 43 serves as a power supply for operating the controller 30 or the system main relays SMR-B, SMR-G.

A secondary battery, such as a lead storage battery and a nickel-metal hydride battery, is used as the auxiliary battery 43. A voltage value VA of the auxiliary battery 43 changes with a charge or discharge of the auxiliary battery 43. The voltage value VB changes with a charge or discharge of the main battery 10. Even when the voltage value VA or the voltage value VB changes, the voltage value VA is lower than the voltage value VB.

A charge of the auxiliary battery 43 is controlled so that the voltage value VA is kept at a reference voltage value. Specifically, when the voltage value VA becomes lower than the reference voltage value as a result of a discharge of the auxiliary battery 43, the auxiliary battery 43 is charged so that the voltage value VA reaches the reference voltage value. Because electric power output from the auxiliary battery 43 is supplied to the auxiliary 44, the voltage value VA needs to be kept at the reference voltage value in order to ensure the operating voltage of the auxiliary 44.

Before the system main relays SMR-B, SMR-G are switched from the off state to the on state, the DC/DC converter 50 steps up the voltage value VA of the auxiliary battery 43, and outputs the stepped-up electric power to the capacitor Cout. Thus, it is possible to charge the capacitor Cout.

As described above, the DC/DC converter 50 is able to perform step-down operation and step-up operation. The operation of the DC/DC converter 50 is controlled by the controller 30. As will be described later, the DC/DC converter 50 is configured such that the function of step-up operation is added to an active clamp forward converter that performs step-down operation.

In the battery system shown in FIG. 1, when the system main relays SMR-B, SMR-G are switched from the off state to the on state, inrush current flows from the main battery 10 to the capacitor Cout. Therefore, in the present embodiment, before the system main relays SMR-B, SMR-G are switched from the off state to the on state, the capacitor Cout is charged with electric power output from the auxiliary battery 43.

Specifically, by charging the capacitor Cout, the voltage value VL is equalized to the voltage value VB or the voltage value VL is brought close to the voltage value VB. When the capacitor Cout is charged in this way, it is possible to suppress flow of inrush current from the main battery 10 to the capacitor Cout at the time when the system main relays SMR-B, SMR-G are switched from the off state to the on state.

It is possible to not only charge the capacitor Cout but also charge the main battery 10 with electric power output from the auxiliary battery 43. When the system main relays SMR-B, SMR-G are in the on state, the main battery 10 is charged.

Figure 2:
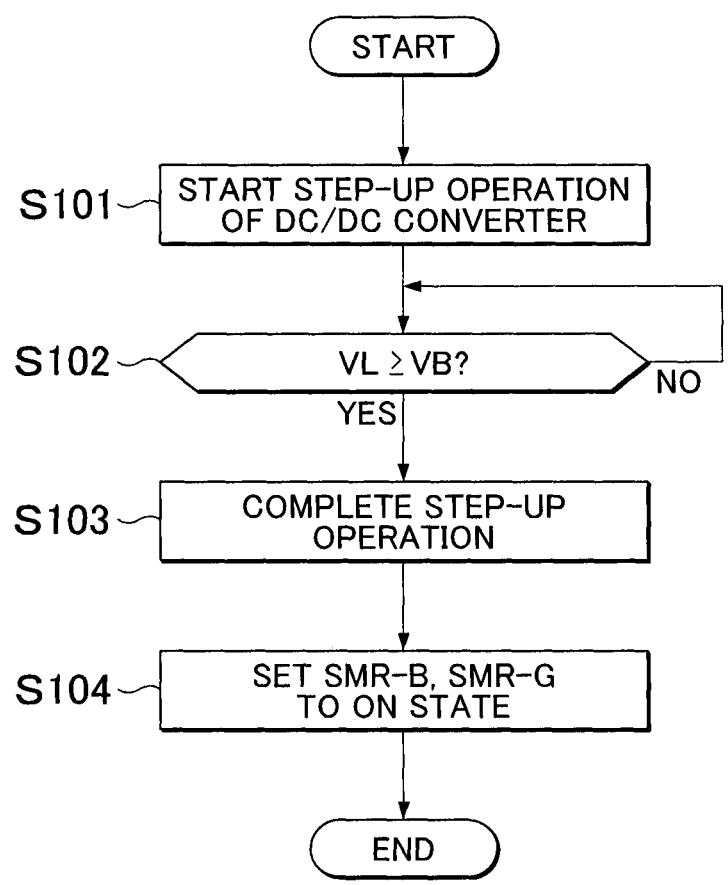
FIG. 2 is a flowchart that shows the process of activating a battery system.

FIG. 2 shows the process of setting the battery system shown in FIG. 1 to an activated state (ready-on state) by connecting the main battery 10 to the inverter 41. The process shown in FIG. 2 is executed by the controller 30, and is started at the time when an ignition switch of the vehicle has switched from an off state to an on state. When the process shown in FIG. 2 is started, the system main relays SMR-B, SMR-G are in the off state.

In step S101, the controller 30 starts the step-up operation of the DC/DC converter 50. When the DC/DC converter 50 steps up the voltage value VA of the auxiliary battery 43, the capacitor Cout is charged with the stepped-up electric power, and the voltage value VL increases. Before the process of step S101 is started, the capacitor Cout is discharged, and the voltage value VL is 0 [V].

In step S102, the controller 30 determines whether the voltage value VL detected by the voltage sensor 23 is higher than or equal to the voltage value VB detected by the voltage sensor 21. When the voltage value VL is lower than the voltage value VB, the step-up operation of the DC/DC converter 50 is continued. When the voltage value VL is higher than or equal to the voltage value VB, the controller 30 completes the step-up operation of the DC/DC converter 50 in step S103. In step S104, the controller 30 switches the system main relays SMR-B, SMR-G from the off state to the on state. Thus, the battery system shown in FIG. 1 enters the activated state.

In the present embodiment, the capacitor Cout is charged through the step-up operation of the DC/DC converter 50 until the voltage value VL becomes higher than or equal to the voltage value VB. However, the invention is not limited to this configuration. Specifically, the capacitor Cout may be charged until the voltage value VL becomes higher than or equal to a voltage value lower than the voltage value VB.

When the battery system shown in FIG. 1 is set to a stopped state (ready-off state) by interrupting connection of the main battery 10 with the inverter 41, the controller 30 switches the system main relays SMR-B, SMR-G from the on state to the off state. At this time, the controller 30 sets the voltage value VL to 0 [V] by discharging the capacitor Cout.

Figure 3:
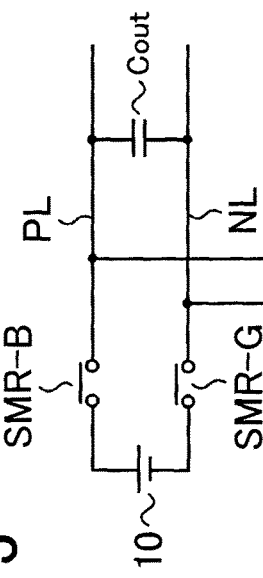
FIG. 3 is a view that shows the circuit configuration of a DC/DC converter.
Figure 3:
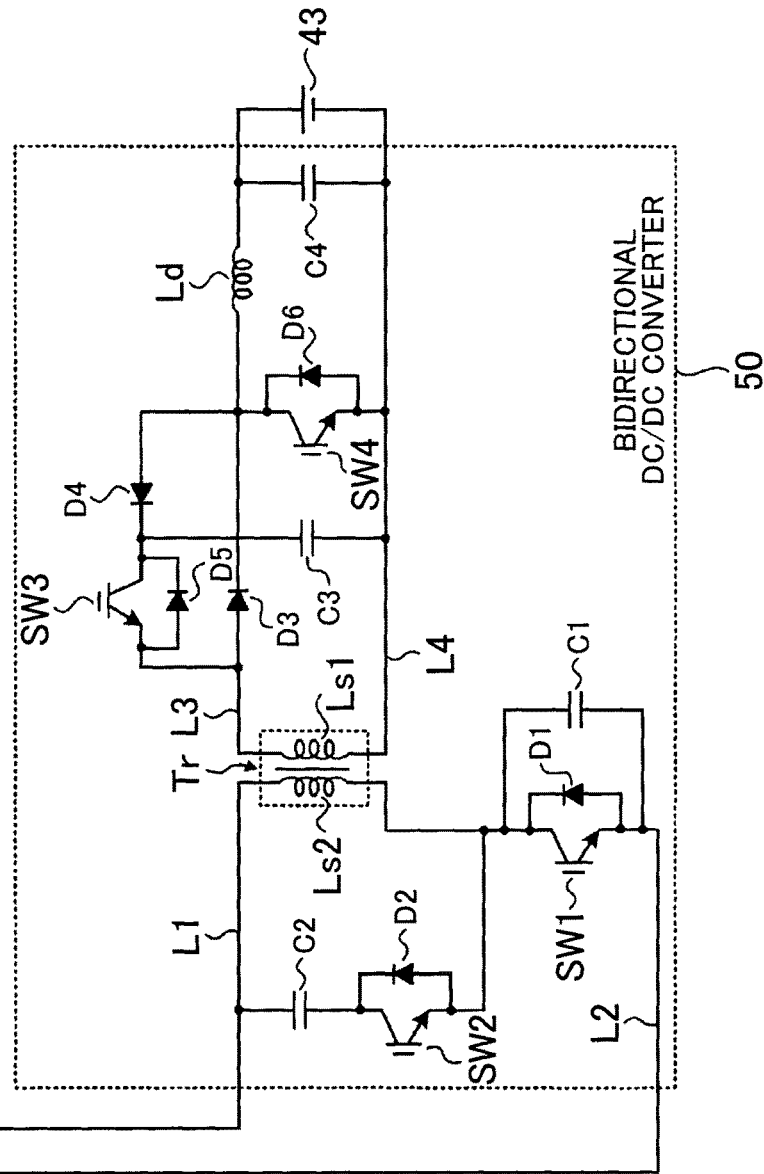

Next, the circuit configuration of the DC/DC converter 50 will be described with reference to FIG. 3. FIG. 3 shows the configuration of part of the battery system in addition to the circuit configuration of the DC/DC converter 50.

A second coil Ls2 of a transformer Tr is connected to the positive electrode line PL and the negative electrode line NL via power lines L1, L2. The power line L1 connected to one end of the second coil Ls2 is connected to the positive electrode line PL. The power line L2 connected to the other end of the second coil Ls2 is connected to the negative electrode line NL.

A first switch element (transistor) SW1 is provided in the power line L2. The first switch element SW1 is connected in series with the second coil Ls2. Specifically, the collector of the first switch element SW1 is connected to the other end of the second coil Ls2, and the emitter of the first switch element SW1 is connected to the negative electrode line NL.

A first diode D1 is connected in antiparallel with the first switch element SW1. In the present embodiment and the invention, antiparallel connection means that a switch element and a diode are connected in parallel with each other such that an energization direction of the switch element is opposite to an energization direction of the diode.

Specifically, the cathode of the first diode D1 is connected to the collector of the first switch element SW1, and the anode of the first diode D1 is connected to the emitter of the first switch element SW1. When the first switch element SW1 is a metal-oxide-semiconductor field-effect transistor (MOSFET), the first diode D1 is a parasitic diode included in the MOSFET. A first capacitor C1 is connected in parallel with the first switch element SW1.

A second capacitor C2 and a second switch element (transistor) SW2 are connected in parallel with the second coil Ls2. The second capacitor C2 and the second switch element SW2 are connected in series with each other. One end of the second capacitor C2 is connected to the power line L1, and the other end of the second capacitor C2 is connected to the collector of the second switch element SW2. The emitter of the second switch element SW2 is connected to a connection point between the second coil Ls2 and the first switch element SW1.

A second diode D2 is connected in antiparallel with the second switch element SW2. Specifically, the cathode of the second diode D2 is connected to the collector of the second switch element SW2, and the anode of the second diode D2 is connected to the emitter of the second switch element SW2. When the second switch element SW2 is a MOSFET, the second diode D2 is a parasitic diode included in the MOSFET.

A first coil Ls1 of the transformer Tr is connected to the auxiliary battery 43 via power lines L3, L4. The power line L3 is connected to one end of the first coil Ls1 and the positive electrode terminal of the auxiliary battery 43. The power line L4 is connected to the other end of the first coil Ls1 and the negative electrode terminal of the auxiliary battery 43.

A third diode D3 and a reactor Ld are provided in the power line L3. The anode of the third diode D3 is connected to one end of the first coil Ls1, and the cathode of the third diode D3 is connected to one end of the reactor Ld. The other end of the reactor Ld is connected to the positive electrode terminal of the auxiliary battery 43.

A third switch element (transistor) SW3 and a fourth diode D4 are connected in parallel with the third diode D3. The third switch element SW3 and the fourth diode D4 are connected in series with each other. The emitter of the third switch element SW3 is connected to a connection point between the first coil Ls1 and the third diode D3. The cathode of the fourth diode D4 is connected to the collector of the third switch element SW3. The anode of the fourth diode D4 is connected to a connection point between the third diode D3 and the reactor Ld.

A fifth diode D5 is connected in antiparallel with the third switch element SW3. Specifically, the cathode of the fifth diode D5 is connected to the collector of the third switch element SW3, and the anode of the fifth diode D5 is connected to the emitter of the third switch element SW3. When the third switch element SW3 is a MOSFET, the fifth diode D5 is a parasitic diode included in the MOSFET.

One end of a third capacitor C3 is connected to a connection point between the third switch element SW3 and the fourth diode D4. The other end of the third capacitor C3 is connected to the power line L4. The third capacitor C3 is connected in parallel with the first coil Ls1 or the auxiliary battery 43.

The collector of a fourth switch element (transistor) SW4 is connected to a connection point between the third diode D3 and the reactor Ld, and is also connected to the anode of the fourth diode D4. The emitter of the fourth switch element SW4 is connected to the power line L4. A sixth diode D6 is connected in antiparallel with the fourth switch element SW4. Specifically, the cathode of the sixth diode D6 is connected to the collector of the fourth switch element SW4, and the anode of the sixth diode D6 is connected to the emitter of the fourth switch element SW4. When the fourth switch element SW4 is a MOSFET, the sixth diode D6 is a parasitic diode included in the MOSFET.

A fourth capacitor C4 is connected in parallel with the auxiliary battery 43. Specifically, one end of the fourth capacitor C4 is connected to a connection point between the reactor Ld and the positive electrode terminal of the auxiliary battery 43. The other end of the fourth capacitor C4 is connected to the power line L4.

The above-described DC/DC converter 50 includes the circuit configuration of the active clamp forward converter, and is able to perform step-down operation with the use of this circuit configuration. In the DC/DC converter 50, the switch elements SW3, SW4, the diodes D4, D5 and the third capacitor C3 are added to the circuit configuration of the active clamp forward converter. Thus, as will be described later, it is possible to perform the step-up operation of the DC/DC converter 50.

In the transformer Tr, the turns ratio between the second coil Ls2 and the first coil Ls1 is set as will be described below.

The voltage value VB of the main battery 10 changes as a result of a charge or discharge of the main battery 10, and can reach a lower limit voltage value VB_min. The lower limit voltage value VB_min is a lower limit value of the voltage value VB that is permitted at the time when a charge or discharge of the main battery 10 is controlled. When the voltage value VB has reached the lower limit voltage value VB_min as well, the voltage value after the step-down operation of the DC/DC converter 50 has been performed needs to be higher than or equal to the voltage value VA of the auxiliary battery 43. When electric power stepped down by the DC/DC converter 50 is supplied to the auxiliary 44, the voltage value after the step-down operation needs to be higher than or equal to the voltage value VA in order to ensure the operating voltage of the auxiliary 44.

As described above, because the voltage value VA is kept at the reference voltage value, the voltage value after the step-down operation of the DC/DC converter 50 has been performed needs to be higher than or equal to the reference voltage value VA. Therefore, the turns ratio between the first coil Ls1 and the second coil Ls2 (the transformation ratio of the transformer Tr) is set on the basis of the lower limit voltage value VB_min and the reference voltage value VA. Specifically, when the number of turns of the first coil Ls1 is denoted by N1 and the number of turns of the second coil Ls2 is denoted by N2, the turns ratio (N2/N1) may be set to a value smaller than or equal to the ratio of the voltage value VB_min to the reference voltage value VA (VB_min/VA).

When the turns ratio (N2/N1) is set in this way, it may not be possible to step up the voltage value VA to the voltage value higher than the lower limit voltage value VB_min only through the step-up operation of the transformer Tr. Therefore, when the voltage value VB is higher than the lower limit voltage value VB_min, it may not be possible to step up the voltage value VL to the voltage value VB even by charging the capacitor Cout through a discharge of the auxiliary battery 43. When the voltage value VL is excessively lower than the voltage value VB, inrush current flows from the main battery 10 to the capacitor Cout at the time when the system main relays SMR-B, SMR-G are set to the on state as described above.

Therefore, in the present embodiment, the voltage value VA of the auxiliary battery 43 is stepped up with the use of the reactor Ld, and the stepped-up voltage value is further stepped up with the use of the transformer Tr. Thus, the DC/DC converter 50 is able to step up the voltage value VA of the auxiliary battery 43 to the voltage value higher than the lower limit voltage value VB_min. When the capacitor Cout is charged with electric power discharged from the auxiliary battery 43, it is possible to increase the voltage value VL of the capacitor Cout to the voltage value VB even when the voltage value VB is higher than the lower limit voltage value VB_min.

Hereinafter, the step-up operation of the DC/DC converter 50 will be described.

Initially, before the step-up operation is started, magnetic energy stored in the transformer Tr as a result of the last step-up operation is reset. The controller 30 sets the switch elements SW1 to SW4 to an off state. At this time, current flows from the second coil Ls2 of the transformer Tr to the second capacitor C2 via the second diode D2. Thus, a negative voltage of the second capacitor C2 increases. On the other hand, when current discharged from the auxiliary battery 43 flows to the third capacitor C3 via the reactor Ld and the fourth diode D4, the voltage value of the third capacitor C3 increases.

Subsequently, the controller 30 switches the switch elements SW2, SW4 from the off state to an on state. While magnetic energy is stored in the transformer Tr, the negative voltage of the second capacitor C2 continues increasing even when the second switch element SW2 is set to the on state. On the other hand, by setting the fourth switch element SW4 to the on state, current discharged from the auxiliary battery 43 flows through the switch element SW4, and magnetic energy is stored in the reactor Ld.

When magnetic energy stored in the transformer Tr disappears, negative electric charge stored in the second capacitor C2 is discharged. Current discharged from the second capacitor C2 flows to the second coil Ls2 of the transformer Tr via the second switch element SW2.

Subsequently, the controller 30 switches the fourth switch element SW4 from the on state to the off state. Thus, magnetic energy stored in the reactor Ld is released, and current flows from the reactor Ld to the third capacitor C3 via the fourth diode D4. The third capacitor C3 is charged, and the voltage value of the third capacitor C3 increases. The voltage value of the third capacitor C3 becomes higher than the voltage value VA of the auxiliary battery 43.

Subsequently, the controller 30 switches the third switch element SW3 from the off state to the on state. When the third switch element SW3 is set to the on state, an LC circuit is formed by the third capacitor C3 and an exciting inductance of the transformer Tr. Thus, exciting current flows through the first coil Ls1 of the transformer Tr, and the voltage value of the first coil Ls1 increases. When the voltage value of the first coil Ls1 increases, the voltage value of the second coil Ls2 increases in accordance with the turns ratio (step-up ratio) between the first coil Ls1 and the second coil Ls2. In this way, the voltage value of the third capacitor C3 is stepped up by the transformer Tr.

When the voltage value of the second coil Ls2 reaches the voltage value according to the turns ratio between the first coil Ls1 and the second coil Ls2 with respect to the voltage value of the first coil Ls1, an LC circuit is formed by the third capacitor C3 and the leakage inductance of the first coil Ls1. Accordingly, current flows from the second coil Ls2 to the capacitor Cout, and the capacitor Cout is charged. The voltage value VL of the capacitor Cout increases. Current for charging the capacitor Cout flows through the second coil Ls2, the capacitor Cout and the first diode D1.

While the capacitor Cout is being charged, the voltage value of the third capacitor C3 decreases as a result of a discharge of the third capacitor C3. Accordingly, the voltage value of the second coil Ls2 decreases, and a charge of the capacitor Cout stops. When the process shown in FIG. 2 is executed, the controller 30 is able to cause the voltage value of the capacitor Cout to reach the voltage value VB by controlling the on/off state of each of the switch elements SW3, SW4.

Next, the step-down operation of the DC/DC converter 50 will be described. The step-down operation is similar to the step-down operation of the active clamp forward converter, and will be simply described below. When the step-down operation is started, the switch elements SW1 to SW4 are in the off state.

The controller 30 sets the first switch element SW1 to the on state. Thus, exciting current flows from the main battery 10 to the second coil Ls2 of the transformer Tr. Current flows through the third diode D3 because of electromotive force that is generated in the transformer Tr. In the transformer Tr, the voltage value VB of the main battery 10 is stepped down in accordance with the turns ratio (step-down ratio) between the second coil Ls2 and the first coil Ls1.

When current flows through the third diode D3, direct-current power rectified by the diodes D3, D6 and smoothed by the fourth capacitor C4 is supplied to the auxiliary battery 43. When the auxiliary battery 43 is charged, current flows through the reactor Ld. Magnetic energy stored in the reactor Ld may be released in a current path including the sixth diode D6.

Subsequently, the controller 30 switches the first switch element SW1 from the on state to the off state. Thus, current flows from the second coil Ls2 of the transformer Tr to the first capacitor C1, and the first capacitor C1 is charged. When the first capacitor C1 is being charged as well, current flows through the third diode D3. When the voltage value of the first capacitor C1 reaches a predetermined voltage value, current flows from the second coil Ls2 to the second capacitor C2 via the second diode D2, and the second capacitor C2 is charged. Because the voltage of the second capacitor C2 is applied to the second coil Ls2 in the opposite direction, exciting current flowing through the second coil Ls2 decreases.

The controller 30 switches the second switch element SW2 from the off state to the on state while the second diode D2 is in a conductive state. Thus, electric charge stored in the second capacitor C2 is released to the second coil Ls2, and exciting current flowing through the second coil Ls2 further decreases. Accordingly, magnetic energy stored in the transformer Tr is reset. The controller 30 is able to release electric charge stored in the first capacitor C1 by switching the second switch element SW2 from the on state to the off state. Current discharged from the first capacitor C1 flows through the second coil Ls2. Thus, a discharge of the first capacitor C1 completes.

As described above, the controller 30 is able to output a constant direct-current voltage from the main battery 10 to the auxiliary battery 43 via the transformer Tr by controlling the on/off state of each of the switch elements SW1, SW2.

According to the present embodiment, because the transformation ratio (step-down ratio) of the transformer Tr is set in consideration of the lower limit voltage value VB_min, it is possible to set the voltage value, which is output from the DC/DC converter 50 to the auxiliary battery 43, to a voltage value higher than or equal to the voltage value VA even when the voltage value VB changes.

On the other hand, when the step-up operation is performed, the voltage value VA of the auxiliary battery 43 is stepped up with the use of the reactor Ld, and is then further stepped up with the use of the transformer Tr. Thus, it is possible to step up the voltage value VB of the auxiliary battery 43 at the step-up ratio larger than the transformation ratio (step-up ratio) of the transformer Tr. Thus, even when the voltage value VB changes, it is possible to set the voltage value, which is output from the DC/DC converter 50 to the capacitor Cout, to a voltage value higher than or equal to the voltage value VB.

The invention claimed is:

1. A DC/DC converter, the DC/DC converter being able to step down a voltage value of a high-voltage battery and being able to step up a voltage value of a low-voltage battery, the low-voltage battery being a battery that provides a lower voltage value than the high-voltage battery, the DC/DC converter comprising:
   a transformer including a first coil and a second coil, the first coil being connected to the low-voltage battery, the second coil being connected to the high-voltage battery;
   a first switch element connected in series with the second coil;
   a first diode connected in antiparallel with the first switch element;
   a first capacitor connected in parallel with the first switch element;
   a second switch element connected in parallel with the second coil;
   a second diode connected in antiparallel with the second switch element;
   a second capacitor connected in series with the second switch element;
   a third diode, an anode of the third diode being connected to one end of the first coil;
   a reactor, one end of the reactor being connected to a cathode of the third diode, the other end of the reactor being connected to a positive electrode terminal of the low-voltage battery;
   a third switch element, one end of the third switch element being connected to a connection point between the first coil and the third diode;
   a fourth diode, a cathode of the fourth diode being connected to the other end of the third switch element, an anode of the fourth diode being connected to a connection point between the third diode and the reactor;
   a fifth diode connected in antiparallel with the third switch element;
   a third capacitor, one end of the third capacitor being connected to a connection point between the third switch element and the fourth diode, the third capacitor being connected in parallel with the first coil and the low-voltage battery;
   a fourth switch element, one end of the fourth switch element being connected to the anode of the fourth diode and the connection point between the third diode and the reactor, the fourth switch element being connected in parallel with the first coil and the low-voltage battery; and
   a sixth diode connected in antiparallel with the fourth switch element.

2. An electrical storage system comprising:
   the DC/DC converter according to claim 1;
   a positive electrode line;
   a negative electrode line;
   a load connected to the high-voltage battery via the positive electrode line and the negative electrode line;
   a pair of relays respectively provided in the positive electrode line and the negative electrode line;
   a smoothing capacitor connected to the positive electrode line and the negative electrode line; and
   a controller configured to
   control the DC/DC converter and the pair of relays;
   step up the voltage value of the low-voltage battery with a use of the DC/DC converter before the pair of relays are switched from an off state to an on state; and
   charge the smoothing capacitor with a stepped-up electric power.

3. The electrical storage system according to claim 2, wherein the load is a motor generator.

* * * * *